(12) United States Patent
Lemut (10) Patent No.: US 6,234,846 B1
(45) Date of Patent: May 22, 2001

(54) COMBINE JACK WITH ADAPTER

(75) Inventor: Drago Lemut, Kranj (SI)

(73) Assignee: Le-Tehnika d.o.o. (SI)

( * ) Notice: Subject to any disclaimer, the term of this patent is extended or adjusted under 35 U.S.C. 154(b) by 0 days.

(21) Appl. No.: 09/268,593

(22) Filed: Mar. 15, 1999

(30) Foreign Application Priority Data

Mar. 19, 1998 (SI) .............................................. SIP-9800083

(51) Int. Cl.⁷ .......................... H01R 25/00; H01R 27/02; H01R 31/00; H01R 33/88; H01R 33/90
(52) U.S. Cl. .......................................... 439/638; 439/676
(58) Field of Search .................... 439/638, 676, 439/639, 956, 532

(56) References Cited

U.S. PATENT DOCUMENTS

| | | | |
|---|---|---|---|
| 4,220,391 | * 9/1980 | Krolak et al. | 439/676 |
| 4,362,905 | * 12/1982 | Ismail | 439/638 |
| 4,392,701 | * 7/1983 | Weidler | 439/638 |
| 5,391,095 | * 2/1995 | Born | 439/676 |
| 5,647,763 | * 7/1997 | Arnold et al. | 439/540.1 |
| 5,651,690 | * 7/1997 | Klas et al. | 439/352 |
| 5,660,554 | * 8/1997 | Mead | 439/172 |

* cited by examiner

Primary Examiner—Tulsidas Patel
Assistant Examiner—Hae Moon Hyeon (57) ABSTRACT

Essence of combine jack with adapter as per invention is, that housing (1) have front side with field (IA) and field (IB), upper side (II) with field (IIA) and field (IIB), bottom side (III) with field (IIIA) and field (IIIB) and flank side (IV) and flank side (V). Housing (1) is dismantle and closed with cover (3), which is marked with (IV). Sides (IV, V and VI) are without fields. Connection element, which is functionally very important for jack is printed circuit board plate. On fields (IA, IB, IIA, IIB, IIIA and IIIB) can be placed protect sleeve, modular jack, standard telephone jack on German area (TAE-N, TAE-F and TAE-U), standard telephone jack on Austrian area (TSS), standard telephone jack on Swiss area (CH) and standard telephone jack on England area (UK), depending on combination you wish. Different combination are defined with table 1, table 2 and table 3.

Construction of combine jack with adapter is characteristically by rectangular hollow prism, which have a fight edge (1a) throughout all sides so the printed circuit board plate (2) rests on it. By compounding, cover (3) with its two pairs of sticks (3a), closes two pairs of rectangular and parallel holes (1b) on side (II) and side (III) of housing (1), and at the same time, both rectangular set-up (3b) and deepen rectangular set-up (3c) in upper and lower part of cover (3), catch in rectangular holes of housing (1).

12 Claims, 9 Drawing Sheets

COMBINE JACK WITH ADAPTER

The present invention relates to the elements for connecting telecommunication devices in public network or inside of housing or business object.

Technical problem which the convention is solving is construction of universal combined modular jack which will in little housing making possible various combinations and simple combining of various modular jacks for connecting telecommunication device on phone network. Every country has own system or standard for connecting telecommunication device on network. Because systems are not compatible one type of modular jack should be adapted with others and one system should be adapted with others. Despite minimal measurements should construction of modular jack make possible simple execution, assembling and fastening of elements. Because of best using of room must order of elements be optimal and despite of small place available should the placing of contacts and modular jacks be optimal also from a view of reliability of working.

Till now are known constructions of various types of modular jack or plugs for each system or standard. Known are also combined jacks which are all adjusted to one system. Combined jack which would make possible simple adaptation of one system to another is not known.

The point of combined jack with adapter on convention is that construction solution inside of housing enables great number of combinations of various jacks which are connected with plate on which is printed circuit board and contacts of jacks for certain combination.

Combined jack with adapter as per invention will in addition be described with help of the following pictures.

Figure 1:
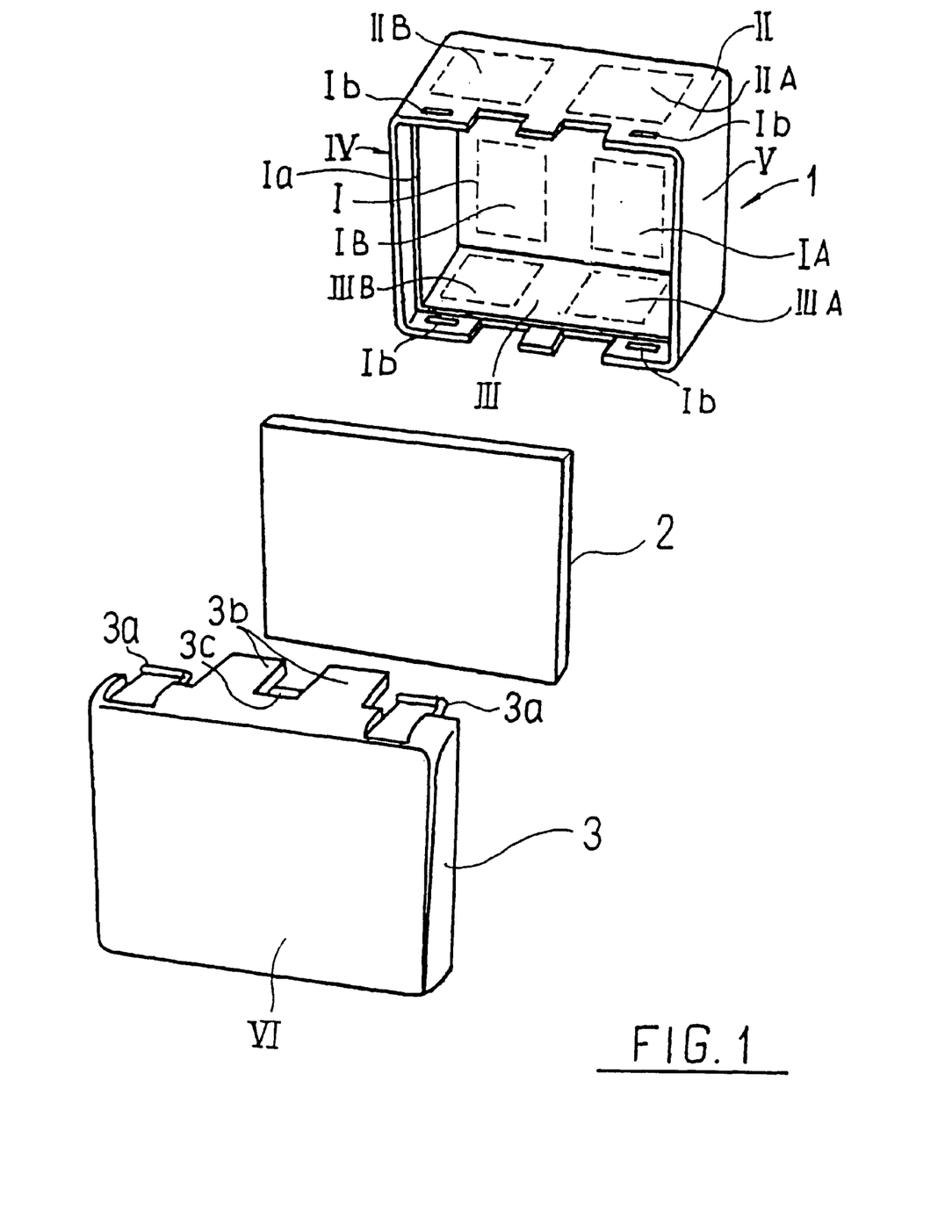
FIG. 1: the main model of combined jack with adapter as per invention

The main combined jack with adapter as per invention is constructed that housing 1 has front side I with area IA and IB, upper side II with area IIA and area IIB, bottom side III with area IIIA and area IIIB and flank side IV and flank side V. Housing 1 is dismantling closed with cover 3 which has a side VI. Sides IV, V and VI are without areas. Connecting element which is functionally important for jack is plate 2 with suitable printed circuit board. In areas IA, IB, IIA, IIB, IIIA, IIIB are placed protect sleeve, modular jack, standard phone jack in Germany (Tae - N, Tae -F and Tae - U), standard phone jack in Austria (Tss), standard phone jack in Swiss (CH) and standard phone jack in England (UK). Various combinations of jacks are determined with table 1, table 2 and table 3. Regarding to combination of jacks and standard technical commands have plates one side or two side printed circuit board. Constructing solution of combined jack with adapter is enabling production of all combinations with one tool, which is regarding to chosen combination adjustable which is decreasing production costs, make possible optimal functioning and use of room and mechanical compact integrity. The column of table 1 is presenting in types A, B, C, D, E, F, G, H, I, J, K, L combinations in areas IIIB and IIIA, where rectangular is presenting protect sleeve, the small sign is modular jack (6/6) and the big sign is modular jack (8/8). In lines of table 1 are types L, K, J, I, H, G, F, E, D, C, B and A. Table 2 is presenting fields IA and IB in which are protect sleeve, modular jack (6/6) and modular jack (8/8). The sign (*) in table 2 is presenting the possible composition where the combination zero (0)is not possible.

TABLE 1

| IIB, IIA / IIIB, IIIA | | L | K | J | I | H | G | F | E | D | C | B | A |
|---|---|---|---|---|---|---|---|---|---|---|---|---|---|
| A | | AL | AK | AJ | AI | AH | AG | AF | AE | AD | AC | AB | AA |
| B | | BL | BK | BJ | BI | BH | BG | BF | BE | BD | BC | BB | |
| C | | CL | CK | CJ | CI | CH | CG | CF | CE | CD | CC | | |
| D | | DL | DK | DJ | DI | DH | DG | DF | DE | DD | | | |
| E | | EL | EK | EJ | EI | EH | EG | EF | EE | | | | |
| F | | FL | FK | FJ | FI | FH | FG | FF | | | | | |
| G | | GL | GK | GJ | GI | GH | GG | | | | | | |
| H | | HL | HK | HJ | HI | HH | | | | | | | |
| I | | IL | IK | IJ | II | | | | | | | | |
| J | | JL | JK | JJ | | | | | | | | | |
| K | | KL | KK | | | | | | | | | | |
| L | | LL | | | | | | | | | | | |

TABLE 2

| IA \ IB | | K | J | H | G | E | D | C | B | A |
|---|---|---|---|---|---|---|---|---|---|---|
| A | | AK | AJ | AH | AG | AE | AD | *AC | *AB | *AA |
| B | | BK | BJ | BH | BG | BE | BD | *BC | *BB | |
| C | | CK | CJ | CH | CG | CE | CD | CC | | |
| D | | DK | DJ | DH | DG | DE | DD | | | |
| E | | EK | EJ | EH | EG | EE | | | | |
| G | | GK | GJ | GH | GG | | | | | |
| H | | HK | HJ | HH | | | | | | |
| J | | JK | JJ | | | | | | | |
| K | | KK | | | | | | | | |

TABLE 3

| IA \ IB | | Tss | | Tae-N | | Tae-F | | Tae-U | | Ch | | UK | |
|---|---|---|---|---|---|---|---|---|---|---|---|---|---|
| Empty | | 0 | 1 | 0 | 2 | 0 | 3 | 0 | 4 | 0 | 5 | 0 | 6 |
| Tss | | 1 | 1 | 1 | 2 | 1 | 3 | 1 | 4 | 1 | 5 | 1 | 6 |
| Tae-N | | | | 2 | 2 | 2 | 3 | 2 | 4 | 2 | 5 | 2 | 6 |
| Tae-F | | | | | | 3 | 3 | 3 | 4 | 3 | 5 | 3 | 6 |
| Tae-U | | | | | | | | 4 | 4 | 4 | 5 | 4 | 6 |
| Ch | | | | | | | | | | 5 | 5 | 5 | 6 |
| UK | | | | | | | | | | | | 6 | 6 |

Combined jack with adapter as per invention is rectangular hollow prism which has inside narrow margin 1a on all sides. Plate 2 with PVC rests on it. At assembling cover 3 with two pairs of sticks 3a falls in two pairs of rectangular parallel openings 1b on side II and side III of housing 1. Rectangular set up 3b and depp rectangular set up 3c on bottom and upper part of cover 3 are falling in rectangular holes of housing 1.

Figure 2:
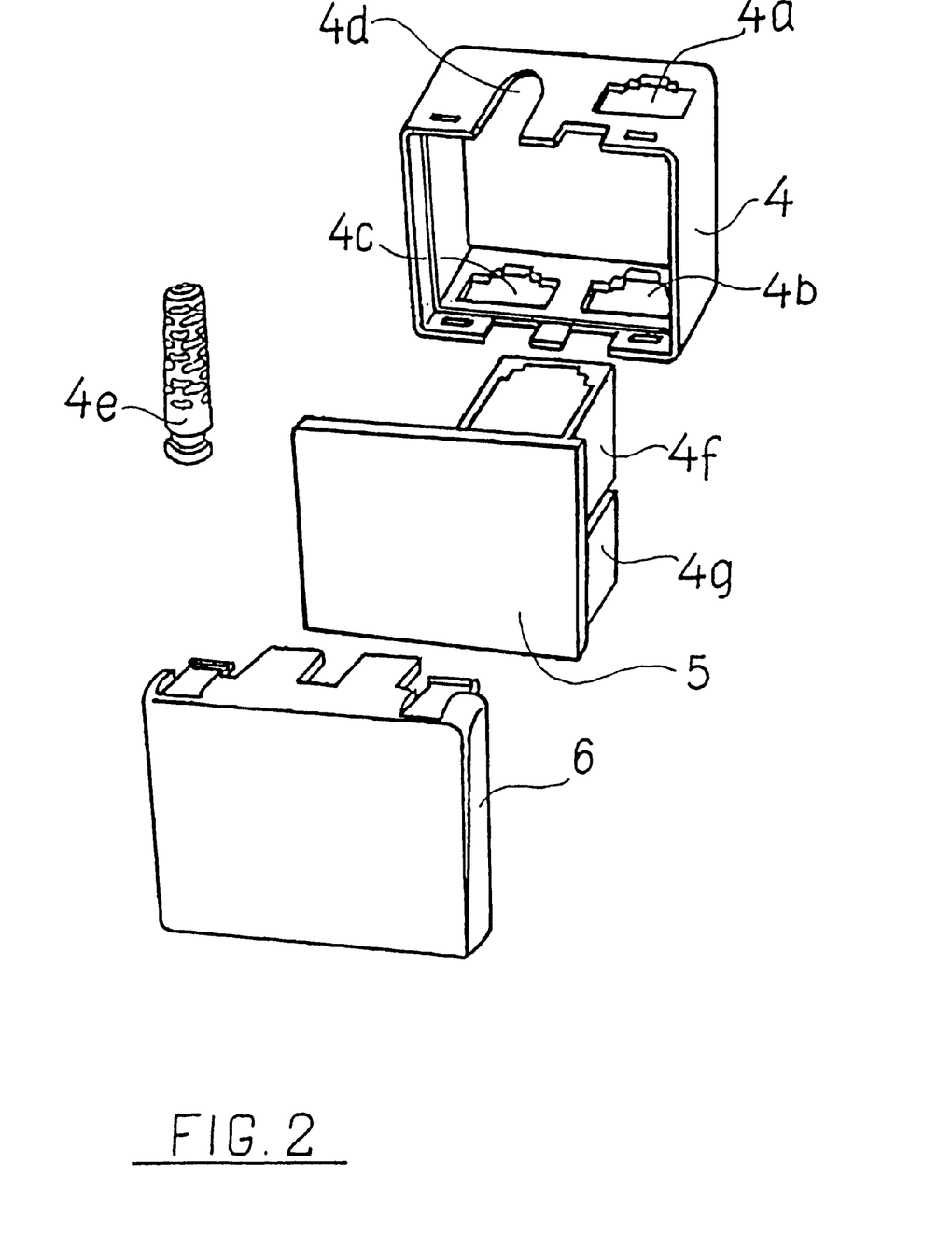
FIG. 2: the composition of combined jack with adapter as per variant I

Combined jack with adapter as per variant I is defined that housing 4 has opening 4a for modular jack 4f and opening 4d for protect sleeve 4e and openings 4b and 4c for modular jack 4g in bottom side of housing 4. Plate 5 with printed circuit board and modular jack 4f and modular jacks 4g is placed between housing 4 and cover 6.

Figures 3, 4:
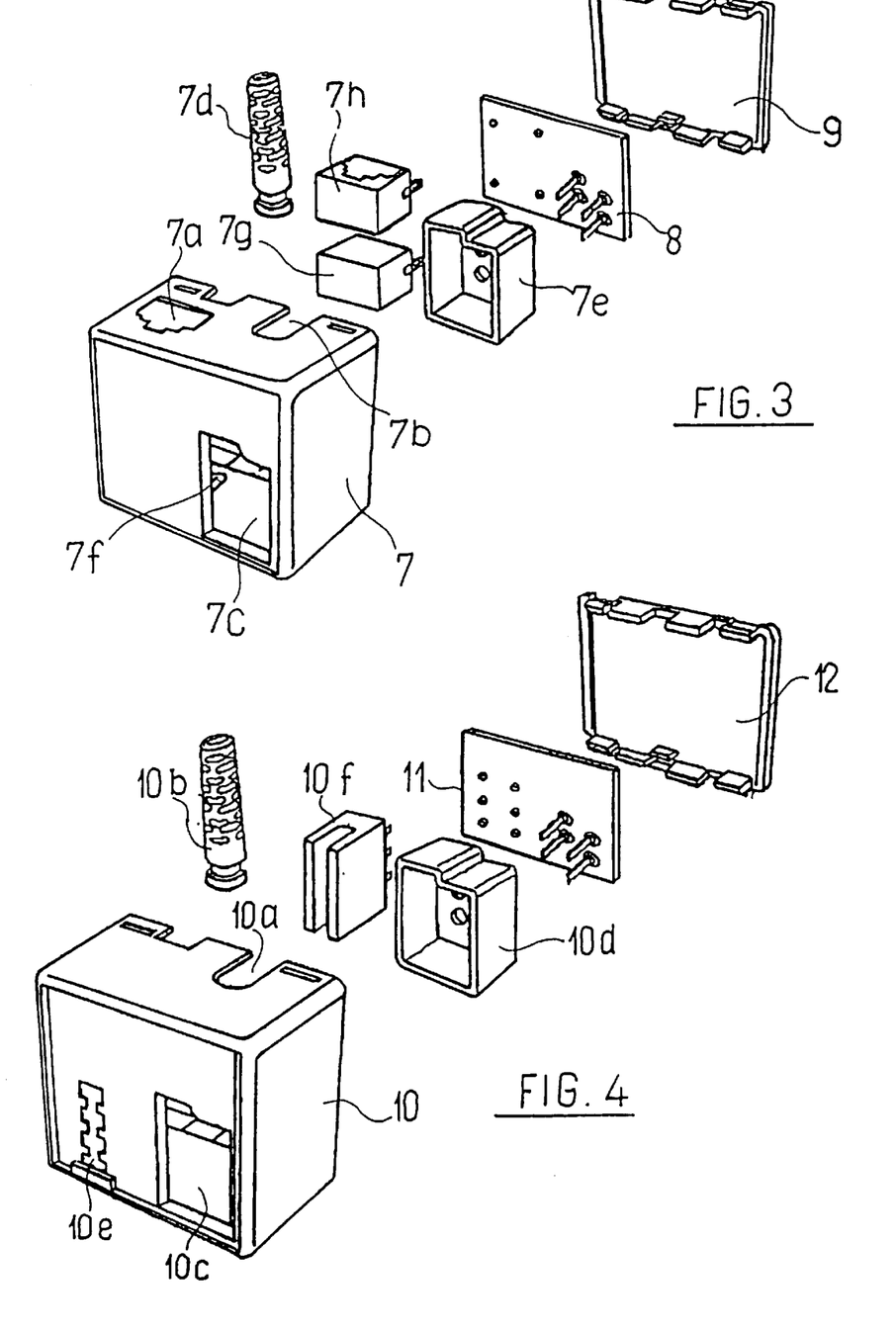
FIG. 3: the composition of combined jack with adapter as per variant II
FIG. 4: the composition of combined jack with adapter as per variant III

Combined jack with adapter as per variant II is defined that has in upper side of housing 7 opening 7a for modular jack 7h and opening 7b for protect sleeve 7d and opening 7c in front side of housing 4 for Swiss jack 7e. In bottom side is opening 7f for modular jack 7g. Modular jacks 7f and 7h are soldered on plate 8 with printed circuit board on which there are fasten contacts of Swiss jack 7e. Housing 7 is closed with cover 9.

Combined jack with adapter as per variant 3 is defined that has in upper side of housing 10 opening 10a for protect sleeve 10b and opening 10c in front side of housing 10 for Swiss jack 10d and opening 10e for Austrian jack 10f. Contacts of Swiss jack 10d and Austrian jack 1f are soldered on plate 11 with printed circuit board. Housing 10 is closed with cover 12.

Figure 5:
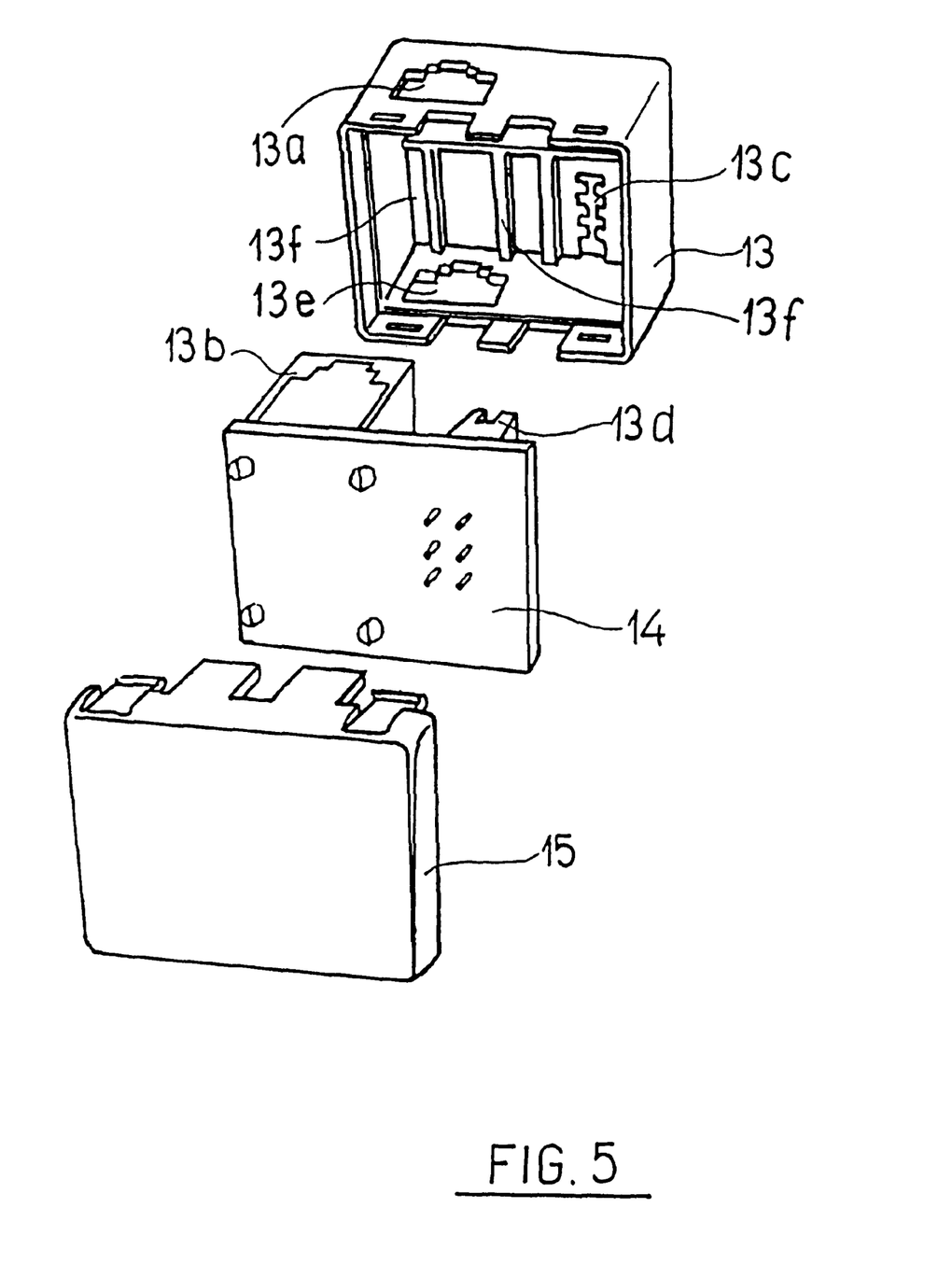
FIG. 5: the combination of combined jack with adapter as per variant IV

Combined jack with adapter as per variant IV is defined that has in upper side of housing 13 opening 13a for first modular jack 13b and opening 13c in front side of housing 13 for Austrian jack 13d. In bottom side is opening 13e for another modular jack 13b. Modular jack 13b and Austrian jack 13d are soldered on plate 14 with printed circuit board. Inside of housing 13 are low ribs 13f for exact fastening of modular jack 13b. Housing 13 is closed with cover 15.

Figure 6:
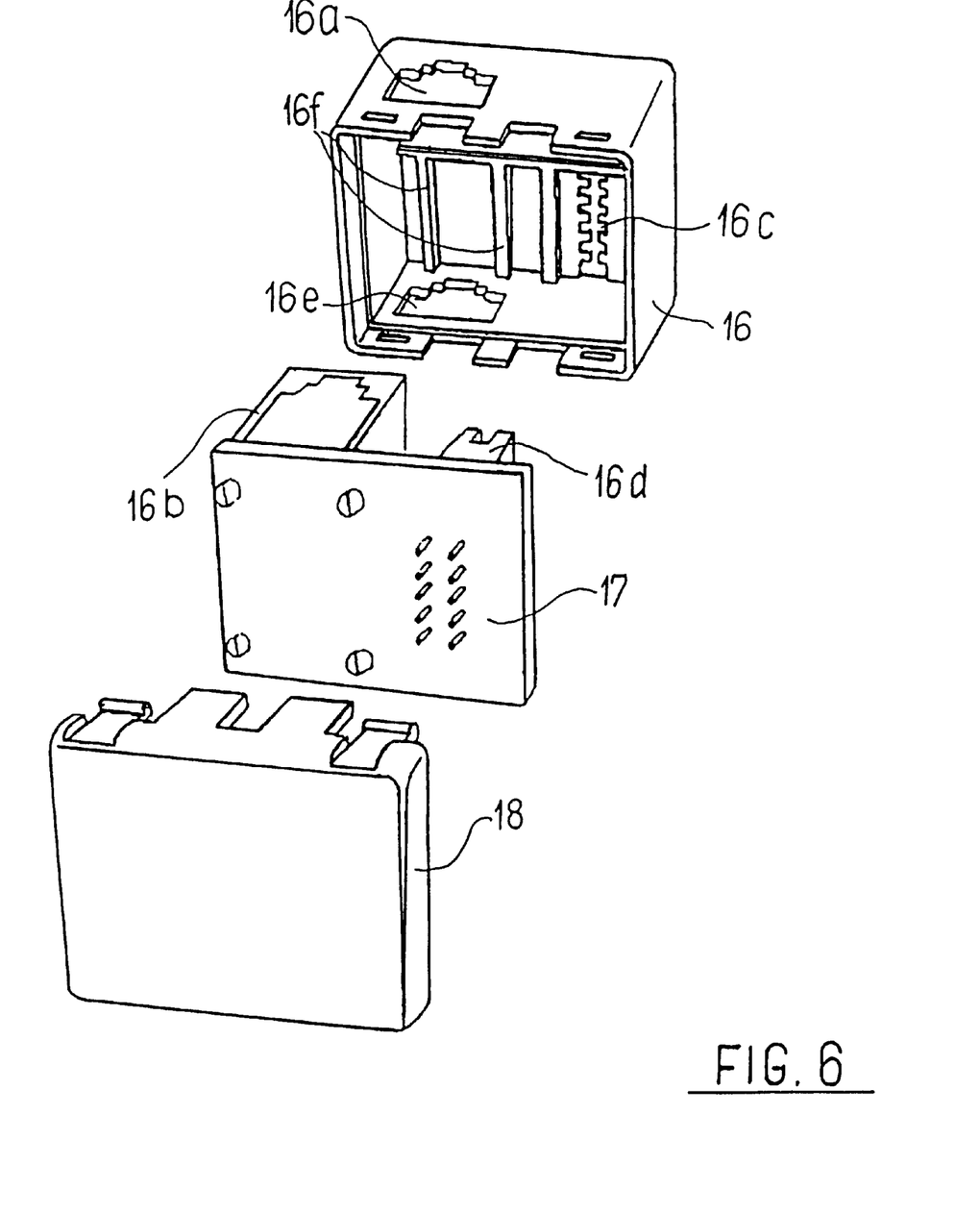
FIG. 6: the combination of combined jack with adapter as per variant V

Combined jack with adapter as per variant V is defined that has in upper side of housing 16 opening 16a for the first modular jack 16b and opening 16c in front side of housing 16 for German jack 16d. In bottom side is opening 16e for another modular jack 16b. Modular jacks 16b and German jack 16d are soldered on plate 17 with printed circuit board. Inside of housing 16 are low ribs 16f for exact placing of modular jacks 16b. Housing 16 is closed with cover 18.

Figure 7:
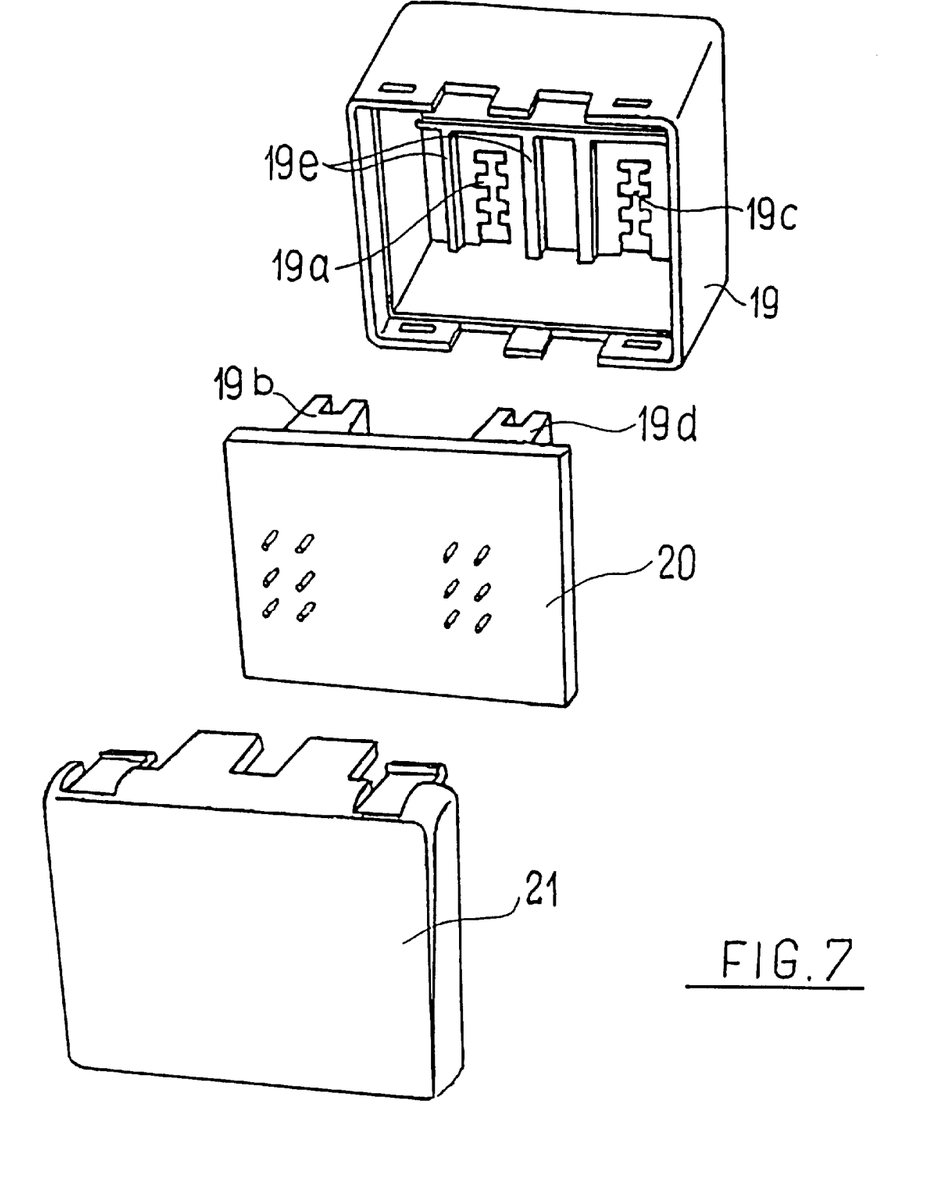
FIG. 7: the combination of combined jack with adapter as per variant VI

Combined jack with adapter as per variant VI is defined that has in front side of housing 19 vertical openings 19a for Austrian jack 19b and opening 19c for Austrian jack 19d. Modular jacks 19b and 19d are soldered on plate 20 with printed circuit board. Inside of housing 19 are low ribs 19e for exact placing of modular jacks 19b and 19d. Closing 19 is closed with cover 21.

Figure 8:
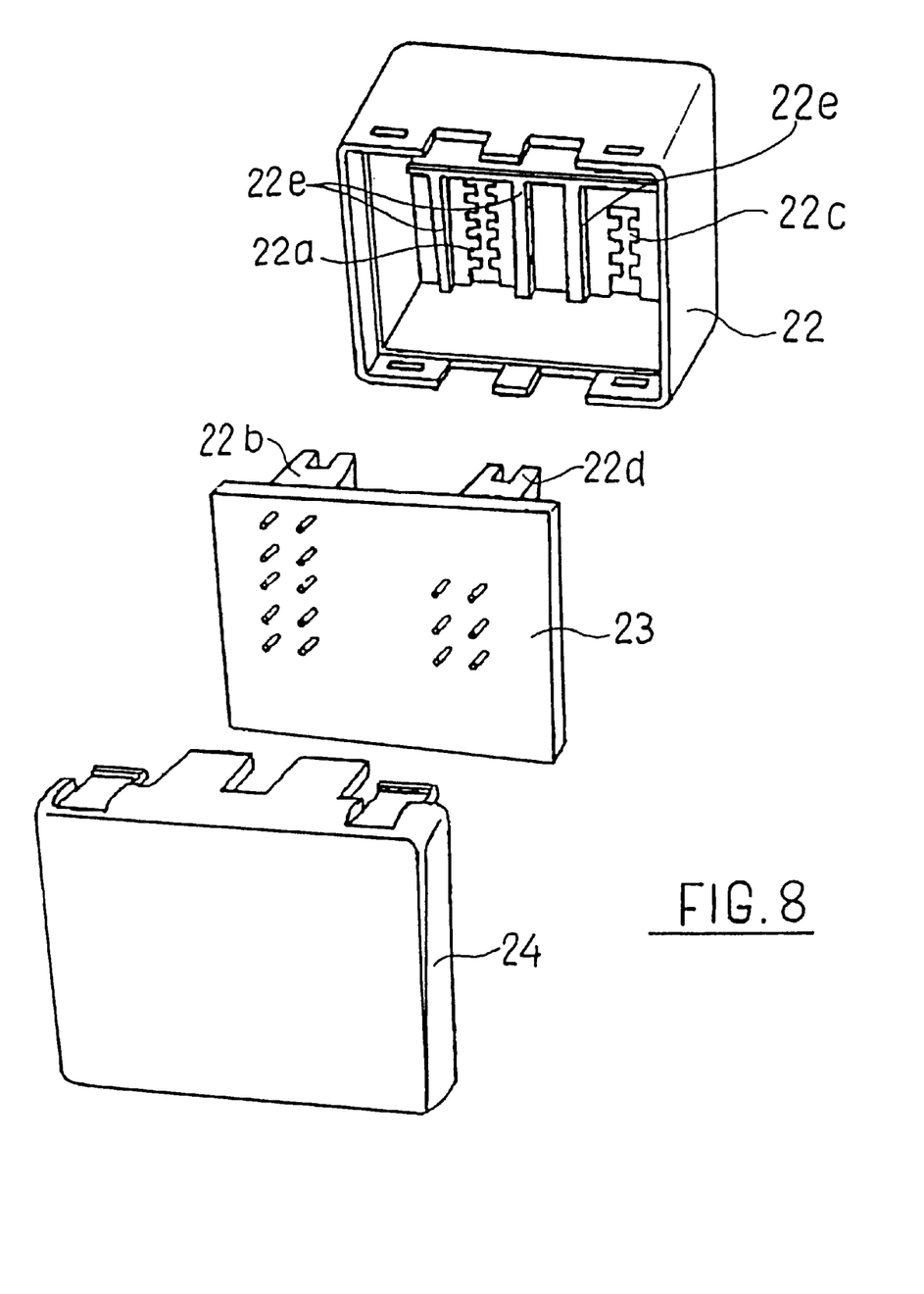
FIG. 8: the combination of combined jack with adapter as per variant VII

Combined jack with adapter as per variant VII is defined that has in front side of closing 22 vertical openings 22a for German jack 22b and opening 22c for Austrian jack 22d. Jacks 22b and 22d are soldered on plate 23 with printed circuit board. Inside of housing 22 are low ribs 22e for exact placing of modular jacks 22b and 22d. Housing 22 is closed with cover 24.

Figure 9:
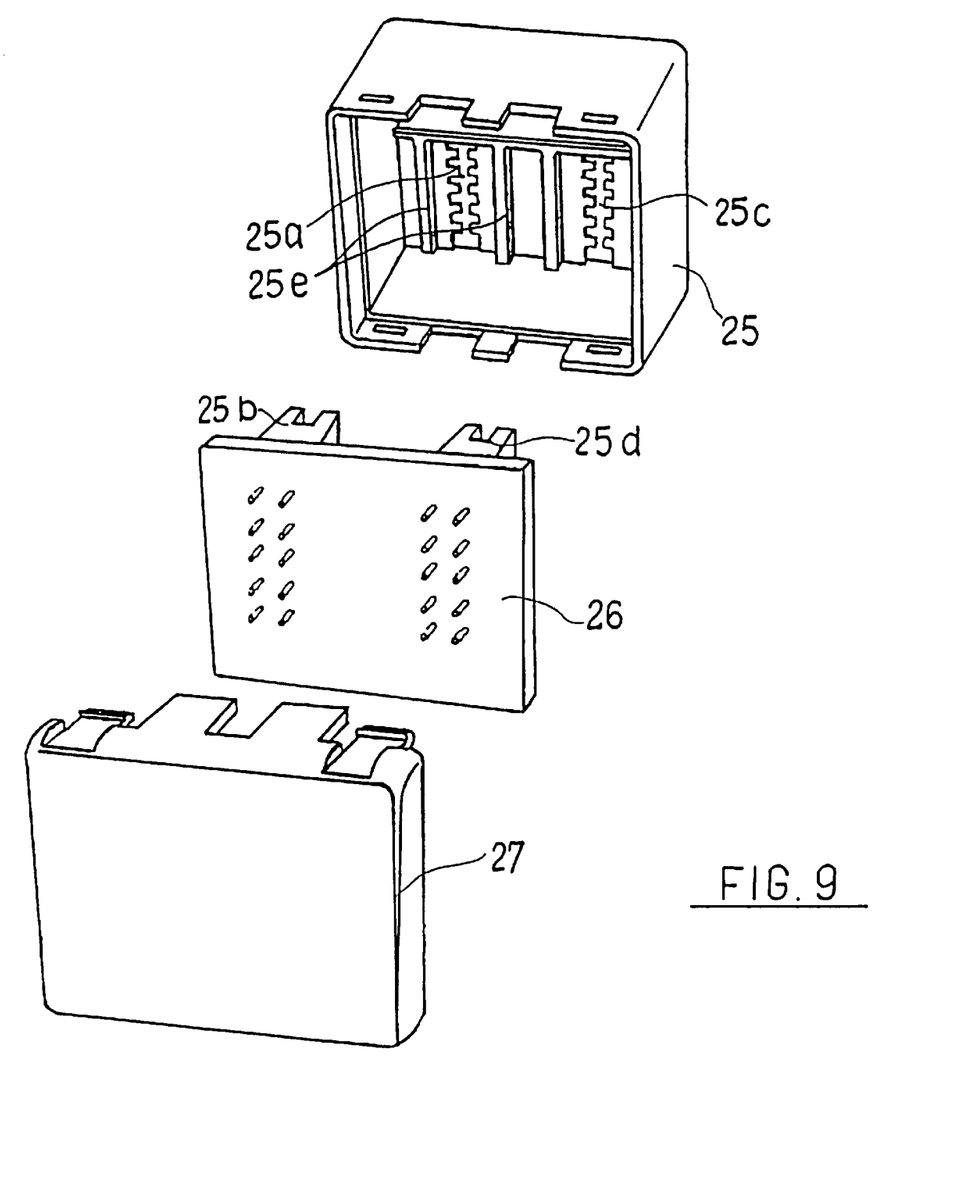
FIG. 9: the combination of combined jack with adapter as per variant VIII

Combined jack with adapter as per variant VIII is defined that has in front side of housing 25 vertical openings 25a for German jack 25b and opening 25c for German jack 25d. Jacks 25b and 25d are soldered on plate 26 with printed circuit board. Inside of housing 25 are low ribs 25e for exact placing of modular jacks 25b and 25d. Housing 25 is closed with cover 27.

Figure 10:
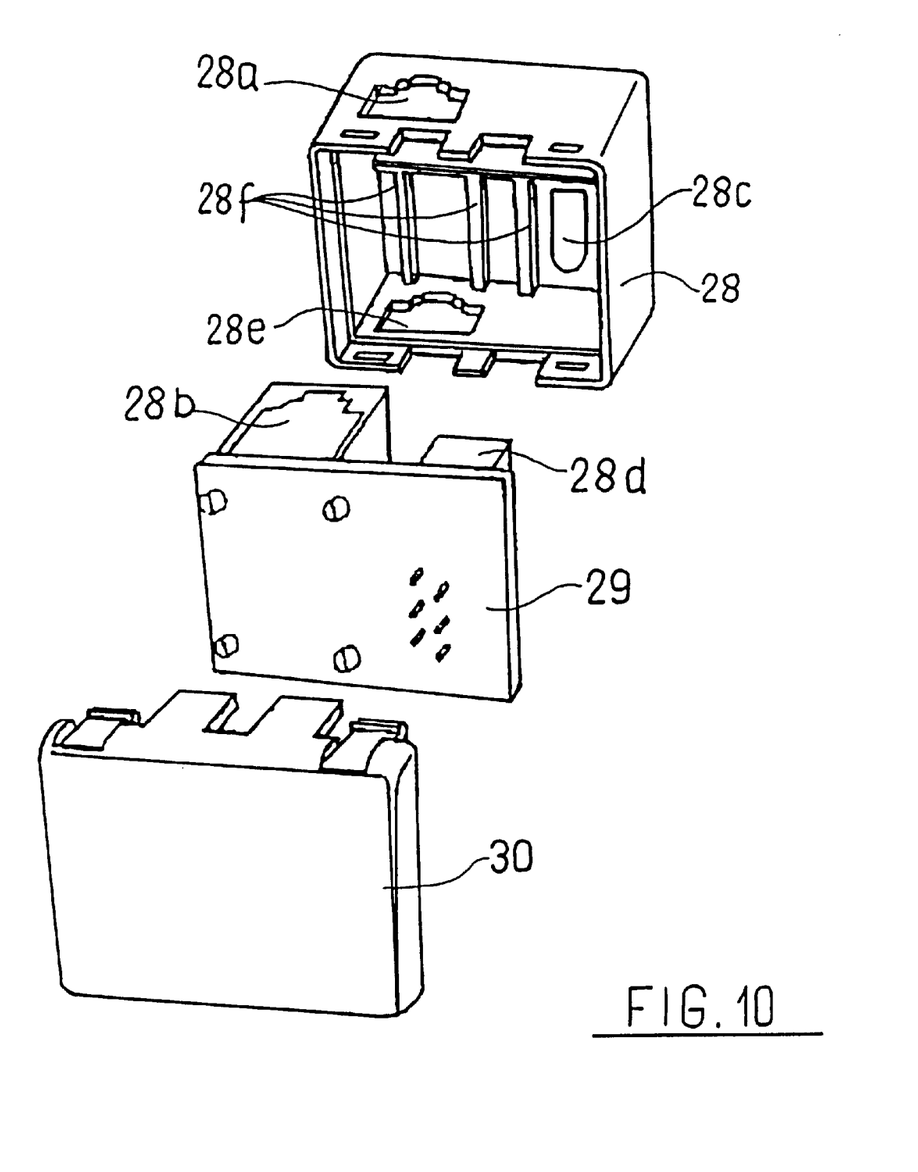
FIG. 10: the combination of combined jack with adapter as per variant IX

Combined jack with adapter as per variant IX is defined that has in front side of housing 28 opening 28a for first modular jack 28b and opening 28c in front side of housing 28 for English modular jack 28d. In bottom side is opening 28e for another modular jack 28b. Modular jacks 28b and English modular jack 28d are soldered on plate 29 with printed circuit board. Inside of housing 28 are low ribs 28f for exact placing of modular 28b. Housing 28 is closed with cover 30.

The advantage of present combined jack with adapter is that in relative small hollow prism there is optimally placed more jacks for plugs of two sistemsand adapter which is enabling adjustment of two different systems where is the functioning of phone line not disturbed. Production of all types of jacks is relatively simple and cheap. Because of great number of combinations the needs of great number of users can be satisfied.

What is claimed is:

1. A combined telecommunication jack with adapter comprising:
    a housing having a front, an upper, a bottom, a first flank, and a second flank sides; said sides each having an inner and an outer surface;
    a plate having a printed circuit board including adaptation circuitry mounted within said housing;
    at least a first jack and a second jack, each associated with said adaptation circuitry, said adaptation circuitry enabling a telecommunication connection therebetween, to in turn facilitate adaptation from said first jack to said second jack and from said second jack to said first jack, wherein the first jack and the second jack comprise one of different jacks utilized in different countries and different jacks utilized in a single country; and
    a cover having first, second, third, fourth, and top sides, and is removably attached to said housing.

2. The combined jack with adapter of claim 1, wherein the at least two jacks selected from the group consisting of, a protective sleeve, a modular telephone jack, a German telephone jack, an Austrian telephone jack, a Swiss telephone jack, an English telephone jack, or any combination thereof.

3. The combined jack and adapter of claim 1, wherein a first modular jack is soldered onto the printed circuit board of said plate and is accessible through an opening passing through said inner and outer surface of said upper side of said housing, and second modular jack is soldered onto the printed circuit board of said plate and is accessible through an opening passing through said inner and outer surface of said bottom side of said housing; said first modular jack and said second modular jack in communication with one another.

4. The combined jack and adapter of claim 1, wherein a first modular jack is soldered onto the print circuit board of said plate and is accessible through a first opening passing through said inner and outer surface of said upper side of said housing, a second modular jack is soldered onto the print circuit board of said plate and is accessible through an opening passing through said inner and outer surface of said bottom side of said housing, a Swiss jack is soldered onto said plate having the printed circuit board and is accessible through an opening passing through said inner and outer surface of said front side of said housing, and a protective sleeve is accessible through a second opening passing through said inner and outer surface of said upper side of said housing; said first modular jack, said second modular jack, and said Swiss jack in communication with one another.

5. The combined jack and adapter of claim 1, wherein a Swiss jack is soldered onto the printed circuit board of said plate and is accessible through a first opening passing through said inner and outer surface of said front side of said housing, an Austrian jack is soldered onto the printed circuit board of said plate and is accessible through an second opening passing through said inner and outer surface of said front side of said housing, and a protective sleeve is accessible through a second opening passing through said inner and outer surface of said upper side of said housing; said Swiss jack and said Austrian jack in communication with one another.

6. The combined jack and adapter of claim 1, wherein said adapter is further comprised of:

at least one rib along said inside surface of said front side of said housing for accurate placement of modular jacks; and a first modular jack soldered onto the printed circuit board of said plate and is accessible through an opening passing through said inner and outer surface of said upper side of said housing, a second modular jack soldered onto said plate having the printed circuit board and is accessible through an opening passing through said inner and outer surface of said bottom side of said housing, and an Austrian jack soldered onto the printed circuit board of said plate and is accessible through an opening passing through said inner and outer surface of said front side of said housing; said first and second modular jacks and said Austrian jack in communication with one another.

7. The combined jack and adapter of claim 1, wherein said adapter is further comprised of:

at least one rib along said inside surface of said front side of said housing for accurate placement of modular jacks; and a first modular jack soldered onto the printed circuit board of said plate and is accessible through an opening passing through said inner and outer surface of said upper side of said housing, a second modular jack soldered onto said plate having the printed circuit board and is accessible through an opening passing through said inner and outer surface of said bottom side of said housing, and a German jack soldered onto said plate having the printed circuit board and is accessible through an opening passing through said inner and outer surface of said front side of said housing; said first and second modular jacks and said German jack in communication with one another.

8. The combined jack and adapter of claim 1, wherein said adapter is further comprised of:

at least one rib along said inside surface of said front side of said housing for accurate placement of Austrian jacks; and a first Austrian jack soldered onto the printed circuit board of said plate and is accessible through a first opening passing through said inner and outer surface of said front side of said housing, and a second Austrian jack soldered onto the printed circuit board of said plate and is accessible through a second opening passing through said inner and outer surface of said front side of said housing; said first and second Austrian jacks in communication with one another.

9. The combined jack and adapter of claim 1, wherein said adapter is further comprised of:

at least one rib along said inside surface of said front side of said housing for accurate placement of a German and an Austrian jack; and a German jack that is soldered onto the printed circuit board of said plate and is accessible through a first opening passing through said inner and outer surface of said front side of said housing, and an Austrian jack is soldered onto the printed circuit board of said plate and is accessible through a second opening passing through said inner and outer surface of said front side of said housing; said German jack and said Austrian jack in communication with one another.

10. The combined jack and adapter of claim 1, wherein said adapter is further comprised of:

at least one rib along said inside surface of said front side of said housing for accurate placement of German jacks; and a first German jack soldered onto the printed circuit board of said plate and is accessible through a first opening passing through said inner and outer surface of said front side of said housing, and a second German jack soldered onto said plate having the printed circuit board and is accessible through a second opening passing through said inner and outer surface of said front side of said housing; said first and second German jacks in communication with one another.

11. The combined jack and adapter of claim 1, wherein said adapter is further comprised of:

at least one rib along said inside surface of said front side of said housing for accurate placement of modular jacks; and a first modular jack soldered onto the printed circuit board of said plate and is accessible through a first opening passing through said inner and outer surface of said upper side of said housing, a second modular jack soldered onto said plate having the printed circuit board and is accessible through an opening passing through said inner and outer surface of said bottom side of said housing, and an English jack soldered onto said plate having the printed circuit board and is accessible through an opening passing through said inner and outer surface of said front side of said housing; said first modular jack, said second modular jack, and said English jack in communication with one another.

12. A combined telecommunication jack with adapter comprising:

a housing having a front, an upper, a bottom, a first flank, and a second flank side; said sides each having an inner and an outer surface;

a plate having a printed circuit board including adaptation circuitry mounted within said housing;

at least a first jack and a second jack, each associated with said adaptation circuitry, said adaptation circuitry enabling a telecommunication connection therebetween, to in turn facilitate adaptation from said first jack to said second jack and from said second jack to said first jack;

a cover having a first, second, third, fourth, and top sides, and is removably attached to said housing;

an inside tight edge along an inside perimeter to enable said plate having the printed circuit board to rest thereon; and a pair of rectangular and parallel openings on said upper and bottom sides of said housing, and said housing is further comprised of a pair of sticks on said first and third sides of said cover; said sticks on said cover configured so as to removably attach to said pair of rectangular and parallel openings on said housing.

* * * * *